Nov. 8, 1955     D. LANGFELD     2,722,753
RADIATOR TESTING APPARATUS
Filed April 5, 1952
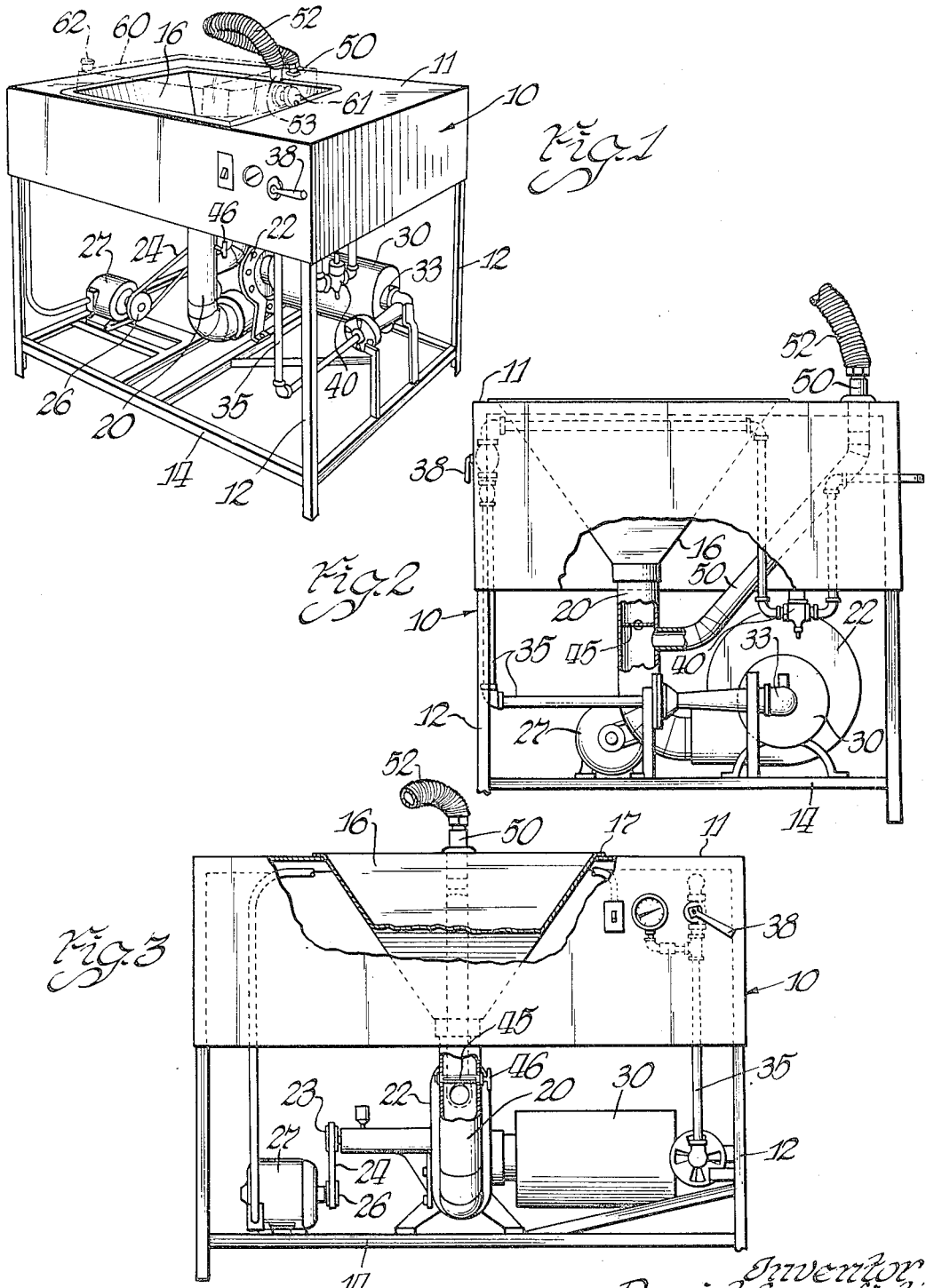

United States Patent Office 2,722,753
Patented Nov. 8, 1955

2,722,753

RADIATOR TESTING APPARATUS

Daniel Langfeld, Omaha, Nebr., assignor to Inland Manufacturing Company, Omaha, Nebr., a corporation of Nebraska Application April 5, 1952, Serial No. 280,805

3 Claims. (Cl. 34—104)

This invention relates to apparatus for use in testing and repairing of automobile radiators and the like.

The problem of repairing leaks in automobile radiators and the like, necessitates, in most instances, the removal of the radiator from its association with the engine and subjecting it to various tests for locating the leaks and then soldering such portions of the radiator, or replacing portions or sections of radiator cores. Because of the practice heretofore employed, as well as the equipment available, the matter of locating and remedying relatively small leaks, such as "pin point openings," presents a difficult task. Such small leaks are very difficult to detect, even when following prior customary testing procedures. Hence, when radiators are checked, tested and repaired it frequently occurs that relatively small heretofore undetected openings in the radiator still present a problem and necessitates re-removal of the radiator from the engine and again subjecting it to tests for possible repair. These prior practices have resulted in the consumption of a substantial amount of time and which has substantially increased the cost of the repair work as well as necessitating further annoyance and inconvenience of the automobile owners.

One of the objects of this invention is to provide novel apparatus by virtue of which it is possible to quickly and easily detect various leaks in a radiator, even leaks in the nature of infinitely small-sized openings, so as to permit proper and efficient repair.

Another object of this invention is to provide improved apparatus of the character indicated which enables a radiator serviceman to quickly dry the interior of a radiator, after it has been washed and cleansed, in order to permit carrying on efficient test operations for locating relatively small leaks in the radiator cores.

A further object of the invention is to provide novel apparatus of the character indicated which permits quick and easy drying of the exterior of the radiator, after it has been washed and cleansed, to prepare it for repainting.

Still another object is to provide novel apparatus of the character indicated which is relatively simple in construction, efficient in use, and which is capable of being economically manufactured.

Other objects and advantages of this invention will be apparent from the following description taken in connection with the accompanying drawing, in which:

Figure 1 is a perspective view of the novel radiator testing and checking apparatus.

Figure 2 is an end elevational view of the apparatus, with portions broken away to show details of construction.

Figure 3 is a side elevational view of the apparatus with portions broken away to show details of construction.

The apparatus embodying the present invention comprises a table-like structure, indicated at 10, having a work supporting top 11, disposed at a proper height for convenient use of a serviceman. The top 11 is supported by vertical legs 12 at each corner, which legs are interconnected by suitable frame structure indicated generally at 14, for supporting various pieces of apparatus to be presently described.

The top 11 of the table is provided with a generally rectangular-shaped opening of a size and of a shape approximating the outline of one face of an automobile radiator. Mounted inside said opening is an upwardly open, divergent nozzle 16 of generally inverted, frusto-pyramidal form. Said nozzle is preferably formed of sheet metal and the upper edge thereof is formed with a marginal flange 17, seated upon the top 11 of the table in surrounding relation to said opening. Connected to the lower end of the nozzle is a tubular duct 20, the opposite end of which duct communicates with the outlet side of a blower 22 mounted on the framing 14. The blower is driven by a pulley 23, through a belt 24, and the latter being trained around a pulley 26, of a motor indicated at 27, carried on said framing.

The inlet side of the blower is operably connected to a heat exchanger, indicated at 30, which is a combustion chamber for a gas burner 33, to which gas is supplied through the conduit 35, under control of a hand operated valve 38. Interposed in the gas supply conduit for purposes of safety, is an automatic flame failure control device indicated at 40. The gas burner serves to supply heated air to the blower and which in turn directs the heated air into the duct 20.

Mounted in the duct 20, below the lower end of the divergent nozzle 16, is a damper or butterfly valve 45, having a finger piece 46, disposed externally of the duct, for controlling the position of adjustment of said valve.

Connected into the duct 20, immediately below the butterfly valve 45 is a conduit 50 which extends in an upwardly inclined direction and through the table top 11, and the upper end being connected to a section of flexible hose indicated at 52, the free end of the section of hose being provided with a suitable nipple indicated at 53.

In using the apparatus embodying the present invention, the radiator is first washed, cleansed and drained thoroughly to remove any foreign matter or accumulation within the radiator cores. An air gun is then employed to blow off the excess water from the fins of the radiator cores. The radiator is then placed on the top 11 of the table in registration with the opening of the upperly divergent nozzle 16. In Figure 1 of the drawing a radiator indicated at 60, is shown in proper position, in dot and dash outline. The filler opening 61 of the radiator is then capped and the nipple 53, on the free end of the section of flexible hose 52, is then attached to the radiator inlet. Assuming that the gas burner and the blower are in operation, the butterfly valve may be adjusted to a position as shown in Figure 2, of the drawing, closing off the upper end of the duct 20, or said value may be adjusted to an intermediate position, so that all or any portion of the heated air discharged from the blower may be deflected from the duct 20 into the conduit 50, for discharge through the flexible hose 52 into the interior of the radiator. The heated air is driven through the radiator and discharged through the radiator outlet opening 62, and the hot air in passing through the interior of the radiator effects a complete drying of the interior of said radiator. To expedite and insure thorough drying of the interior of the radiator, the flexible hose may subsequently be altered in its connection to the radiator; its nipple 53 at the end of sectional hose 52 may then be attached to the outlet 62 of the radiator so as to permit heated air to pass through and discharge from the inlet opening of the radiator. After the radiator is thoroughly dried interiorly, the inlet and outlet openings of the radiator are then suitably capped or plugged. An air hose is then attached to the overflow opening of the radiator and the radiator may, by the use of other conventional equipment, be submerged in water with air being introduced therein under pressure through the overflow opening. By virtue of such testing, the most minute leaks or openings in the radiator cores will readily manifest themselves by producing small air bubbles in the water and will permit immediate location of such leaks for subsequent repair, such as by soldering, or by removal of a section of core and replacement thereof with a new section. Hence, it is possible for the first time in testing and checking of automobile radiators to do a thorough and complete testing operation which will insure exposing all leaks that require repair. Thorough drying of the interior of the radiator, before testing by use of air under pressure, is highly necessary because small particles of water might serve to plug relatively small leaks or openings and which prevent ready detection of such leaks.

After the radiator has been repaired, an air gun is again employed to blow off excess water from the radiator fins and the radiator is again placed upon the work table 10 in registration with the opening of the divergent nozzle 16, and the butterfly valve 45 is then readjusted to approximately vertical position, within the duct 20, so that the heated air supplied from the heat exchanger and blower is caused to pass through the divergent nozzle into direct contact with the face of the radiator, for efficiently drying the entire exterior surface of the radiator and thereby enabling the same to be quickly painted, thus effecting a substantial saving of time.

The apparatus embodying the present invention will now permit quick and efficient checking and testing of an automobile radiator for insuring proper repair thereof, and insures exposing of relatively small leaks which heretofore have not been possible to detect because of the manner and the equipment heretofore employed. Furthermore, the present apparatus permits quick drying of the exterior of the repaired radiator so that it may be immediately repainted. By virtue of the construction embodied in the present invention, a highly efficient and satisfactory radiator service and repair operation can be performed.

Although I have herein shown and described a preferred embodiment of my invention, manifestly it is capable of modification and re-arrangement of parts without departing from the spirit and scope thereof. I do not, therefore, wish to be understood as limiting this invention to the precise embodiment herein disclosed, except as I may be so limited by the appended claims.

I claim as my invention:

1. Apparatus for testing and repairing automobile radiators, comprising a work supporting table having a top provided with an opening of a size approximating the outline of one face of an automobile radiator, an upwardly open divergent nozzle registering at its upper end with said opening, a blower, a duct connected at one end to the outlet side of said blower and the opposite end being connected to the lower end of the nozzle, a conduit operably connected at one end to said duct, intermediate its length, and having its upper end extending through said table top, and a section of flexible hose connected to said upper end of said conduit.

2. Apparatus for testing and repairing automobile radiators, comprising a work supporting table having a top provided with an opening of a size approximating the outline of one face of an automobile radiator, an upwardly open divergent nozzle registering at its upper end with said opening, a blower, a heat exchanger operably connected to the inlet side of said blower, a duct connected at one end to outlet side of said blower and the opposite end being connected to the lower end of the nozzle, a conduit operably connected at one end to said duct, intermediate its length and having its upper end extending through said table top, a section of flexible hose connected to said upper end of said conduit, and a butterfly valve interposed in the duct between the lower end of the nozzle and said conduit for selectively directing the air into said nozzle and said flexible hose.

3. Apparatus for testing and repairing automobile radiators, comprising a work supporting table having a top provided with an opening of a size approximating the outline of one face of an automobile radiator, an upwardly open divergent nozzle registering at its upper end with said opening, a blower, a duct connected at one end to outlet side of said blower and the opposite end being connected to the lower end of the nozzle, a conduit operably connected at one end to said duct, intermediate its length and having its upper end extending through said table top, a section of flexible hose connected to said upper end of said conduit, and a butterfly valve interposed in the duct between the lower end of the nozzle and said conduit for selectively directing the air into said nozzle and said flexible hose.

References Cited in the file of this patent

UNITED STATES PATENTS

| | | |
|---|---|---|
| 1,969,953 | Swartz | Aug. 14, 1934 |
| 2,285,261 | Ellis | June 2, 1942 |
| 2,423,391 | Kozloff | July 1, 1947 |
| 2,608,322 | Hansen et al. | Aug. 26, 1952 |

FOREIGN PATENTS

| | | |
|---|---|---|
| 22,463 | Great Britain | 1902 |
| 24,053 | Great Britain | 1904 |